April 20, 1937.  A. H. HARTWIG  2,078,176

WELDED CENTER PLATE

Filed May 23, 1935

INVENTOR:
ARTHUR H. HARTWIG.
by Oscar Hochberg
his ATTORNEY.

Patented Apr. 20, 1937

2,078,176

UNITED STATES PATENT OFFICE 2,078,176

WELDED CENTER PLATE

Arthur H. Hartwig, Michigan City, Ind., assignor to Pullman-Standard Car Manufacturing Company, Chicago, Ill., a corporation of Delaware Application May 23, 1935, Serial No. 22,951

12 Claims. (Cl. 308—137)

The invention relates to a bearing of the type used in supporting a vehicle upon a truck in swiveling relation thereto.

More particularly, the invention pertains to a center plate construction for railway vehicles and has for its principal object the provision of a center bearing comprised of more than one part and reduced to a unitary structure by welding.

Another and important object of the invention is the provision of a center plate for railway vehicles having an annular bearing of hollow box section providing the utmost strength and resistance to stress in either lateral or vertical directions.

Other objects and advantages of the invention will be apparent from an inspection of the drawing in which Figs. 1 is an inverted plan view of a center plate constructed in accordance with the teaching of this invention;

Figure 1:
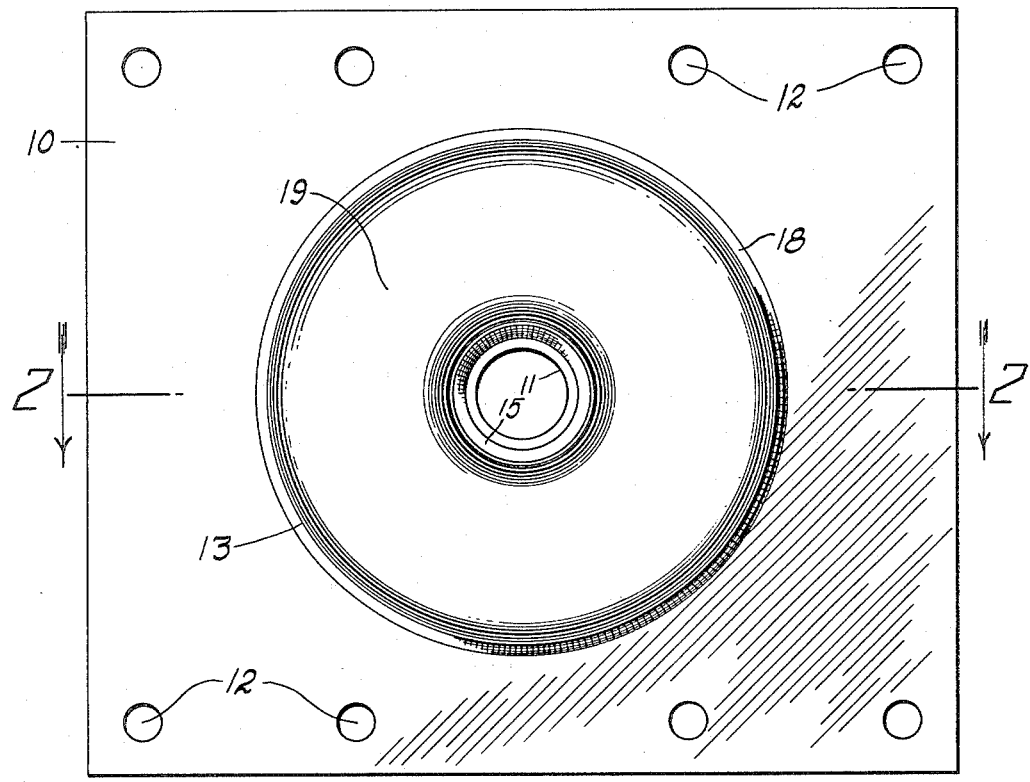
Figure 2:
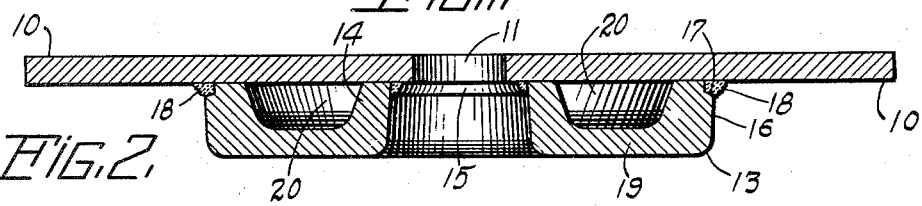
Fig. 2 is a view in cross section taken on the line 2—2 of Fig. 1 and illustrating one method of constructing the center plate.

As shown in Figs. 1 and 2 of the drawing, the center plate is composed of the flange plate 10, having the centrally disposed opening 11 for the passage of the usual locking king pin (not shown) and perforations 12 for rivets or other fastening means for attaching the plate member to a vehicle or truck, and a bowl 13 of annular channel configuration. The flange plate 10 is preferably flat to provide a complete surface engagement with the part to which it is to be attached. The bowl 13 is disposed circumferentially about the central opening 11 upon one face of the plate 10 and secured thereto by welding. The annular inner flange 14 of the bowl 13 is welded about its upper periphery at 15 to the flange plate 10. The outer flange 16 is chamfered about its upper periphery on the outermost side to provide, with the overlying plate 10, a groove 17 which is filled with the weld metal 18 securing the bowl to the flange plate 10. It will be noted that the welds 15 and 18 are disposed on the innermost and outermost sides of the inner and outer flanges 14 and 16 respectively and upon one side of the plate 10 whereby the welding operations may more readily be performed simultaneously in an automatic welding machine.

A hollow annular box section 20 is formed by the concentric inner and outer flanges 14 and 16, the plate 10 and bearing face 19 of the bowl. The flanges 14 and 16 act as struts between the flange plate 10 and the bearing face 19.

The parts comprising the center plate are each of them readily fabricated. The bowl 13 may be a simple forging, and the flange plate 10 merely requires the provision of the central hole 11 and perforations 12.

As shown, the center plate is adapted for application to a vehicle in a depending position for cooperation with a female member on a supporting truck but may well be applied to a truck in an inverted position for cooperation with the female member mounted on the vehicle.

Figure 3:
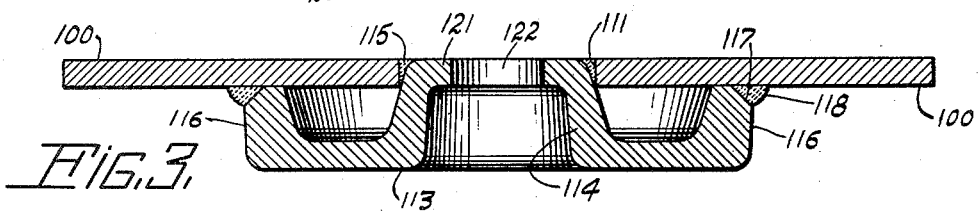
Fig. 3 is a view similar to Fig. 2 but illustrating another embodiment of the invention.

The center plate illustrated in Fig. 3 is slightly modified from that shown in Fig. 2. The outer flange 116 of the bowl 113 is beveled at 117 about its outer periphery adjacent the flange plate 100 and is secured to the flange plate by weld metal 118 disposed in the groove formed by the beveled edge and plate 100. The bowl 113 is interlocked with the flange plate 100 and relieves the welds 115 and 118 of shear stresses resulting from lateral thrusts on the bowl. The annular inner flange 114 is extended within the opening 111 in the flange plate 100 and integral with a horizontal portion 121 in the plane of the flange plate. The horizontal portion 121 is provided with an opening 122 for a king pin and is welded to the flange plate at 115 on the side of the plate opposite to that upon which is disposed the weld 118 securing the outer flange 116 to the plate 100.

Figure 4:
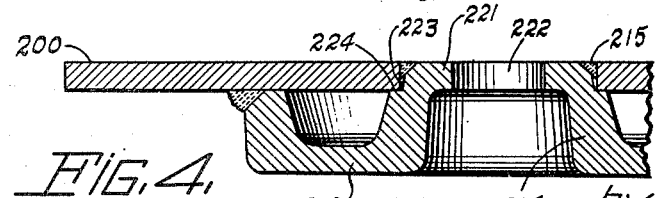
Fig. 4 is a similar view illustrating a slightly modified form.

The construction of the center plate of Fig. 4 differs from that illustrated in Fig. 3 in that the inner flange 214 is chamfered about its upper periphery at 223 to provide a support 224 underlying the flange plate 200 which acts as a strut between the flange plate and bearing face 219. The horizontal portion 221, integral with the annular flange 214, is interlocked with the flange plate 200 and welded thereto at 215. King pin hole 222 is provided in the horizontal portion 221.

From the foregoing it will be seen that there may be provided a fabricated center plate that is readily adapted to welding, having a hollow annular box section bearing of utmost strength and resistance to stress and in which the parts comprising the center plate may be so interlocked as to relieve the welds integrating the structure of at least a portion of the stresses to which they would otherwise be subjected.

What I claim is:—

1. A fabricated center plate comprising a plate member and a hollow bowl member integrally secured together.

2. A fabricated center plate comprising a flat plate member and a hollow bowl member integrated by welding and together forming an annular closed box section bearing.

3. A fabricated center plate comprising a flat plate member and a hollow bowl member secured to said plate member by a plurality of concentric welds, and together forming a unitary fully closed annular box section bearing.

4. A fabricated center plate comprising a flat plate member and a bowl member of annular channel configuration having concentric inner and outer marginal flanges, at least one of said flanges integrally secured to said plate and forming a hollow annular fully closed box section bearing.

5. A fabricated vehicle center plate comprising a flat plate member and a bowl member having concentric inner and outer marginal flanges disposed in edgewise engagement with said plate and secured thereto and forming therewith a hollow fully closed box section bearing of annular form.

6. A fabricated center plate for railway cars comprising a flat plate member having a centrally disposed opening and a bowl member of annular channel configuration disposed about said opening with the flanges of said bowl member secured edgewise to said plate and forming therewith a fully closed box section bearing.

7. A fabricated center plate comprising a flat plate member, a bowl member of annular channel configuration disposed with the flanges thereof in edgewise engagement with said plate and forming therewith a hollow fully closed box section bearing, one of said flanges being chamfered about its pheriphery adjacent said plate, and weld metal disposed in said chamfer integrally securing said bowl to said plate.

8. A fabricated center plate comprising a flat plate member having a centrally disposed opening, a bowl member having concentric inner and outer flanges in edgewise engagement with said plate about said opening and forming when assembled therewith a closed box section bearing, one of said flanges having a beveled edge, and weld metal disposed in said bevel securing said bowl integrally to said plate.

9. A fabricated center plate comprising a flat plate member having a centrally disposed opening, a bowl member of annular channel configuration, the innermost flange of said channel being of greater height than the outer flange and entered within the central opening in said plate, both of said flanges being secured thereto and when assembled with said plate forming an integral closed box section bearing.

10. A fabricated center plate comprising a flat plate member having a centrally disposed opening, a bowl member having concentric inner and outer flanges, said inner flange being of greater height than the outer flange and entered in the central opening in said plate and having a chamfer about its upper periphery underlying said plate member, both of said flanges secured to said plate and forming therewith an integral closed box section bearing of annular form.

11. A fabricated center plate comprising a flat plate member, a bowl member of annular channel configuration, at least one of the flanges of said channel being interlocked with said plate, at least one of said flanges secured to said plate by welding, and together therewith forming a fully closed box section bearing.

12. A fabricated center plate comprising a plate member having a central opening and a bowl member having an inner peripheral flange extending within said opening and secured about its outer periphery to one side of said plate by welding, and a weld concentric to said outer weld disposed upon the opposite side of said plate and securing the inner periphery of said bowl to the plate.

ARTHUR H. HARTWIG.